United States Patent
Nunez Mencias et al.

(10) Patent No.: US 11,824,984 B2
(45) Date of Patent: Nov. 21, 2023

(54) STORAGE ENCRYPTION FOR A TRUSTED EXECUTION ENVIRONMENT

(71) Applicant: International Business Machines Corporation, Armonk, NY (US)

(72) Inventors: Angel Nunez Mencias, Stuttgart (DE); Nicolas Maeding, Holzgerlingen (DE); Peter Morjan, Boeblingen (DE); Dirk Herrendoerfer, Sindelfingen (DE); James Robert Magowan, Woking (GB); Anbazhagan Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/572,687

(22) Filed: Jan. 11, 2022

(65) Prior Publication Data

US 2023/0224156 A1    Jul. 13, 2023

(51) Int. Cl.
*H04L 9/14* (2006.01)
*G06F 12/14* (2006.01)

(52) U.S. Cl.
CPC .......... *H04L 9/14* (2013.01); *G06F 12/1408* (2013.01); *G06F 2212/1052* (2013.01)

(58) Field of Classification Search
CPC . H04L 9/14; G06F 12/1408; G06F 2212/1052
See application file for complete search history.

(56) References Cited

U.S. PATENT DOCUMENTS

| | | | |
|---|---|---|---|
| 2016/0350534 A1* | 12/2016 | Poornachandran | H04L 9/3273 |
| 2017/0140153 A1 | 5/2017 | Zimmer et al. | |
| 2018/0069852 A1* | 3/2018 | Buendgen | G06F 12/14 |
| 2021/0266148 A1 | 8/2021 | Tsirkin | |

FOREIGN PATENT DOCUMENTS

CN        111444553 A        7/2020

OTHER PUBLICATIONS

Kun et al., "A Solution to Make Trusted Execution Environment More Trustworthy" IJPE, vol. 14, No. 9, (2018) pp. 2127-2136.
Gotoz, "runq" https://github.com/gotoz/runq (Retrieved Dec. 28, 2021), 6 pages.

* cited by examiner

*Primary Examiner* — Matthew T Henning
(74) *Attorney, Agent, or Firm* — CANTOR COLBURN LLP; Anthony Mauricio Pallone (57) ABSTRACT

Aspects of the invention include loading an image of a virtual server onto a boot partition of a trusted execution environment (TEE), wherein a first key is embedded in the image. A second key is received from an end customer of an application. Data is received from an independent software vendor (ISV) of the application, wherein the data includes a third key. The second key and the third key are combined inside the TEE to create a fourth key. An available memory space in an independent memory device is encrypted using the fourth key to create a secure data volume. Encrypted data is stored in the secure data volume.

20 Claims, 4 Drawing Sheets

STORAGE ENCRYPTION FOR A TRUSTED EXECUTION ENVIRONMENT

BACKGROUND

The present invention generally relates to programmable computing systems, and more specifically, to programmable computing systems configured to encrypt storage for a trusted execution environment.

Data encryption is a process by which a computer system encodes data from one form to another form, such that only those that possess a key can read the translated data. Computer systems encrypt data to protect confidential information from malicious actors. A computer system transmits unencrypted data to an encryption device that encrypts the data using an encryption algorithm. Issues arise when the encryption device is disconnected from the encrypted data, and the encryption algorithm is not known to the holder of the data.

SUMMARY

Embodiments of the present invention are directed to a computer-implemented method for encrypting storage for a trusted execution environment. A non-limiting example of the computer-implemented method includes loading an image of a virtual server onto a boot partition of a trusted execution environment (TEE), wherein a first key is embedded in the image. A second key is received from an end customer of an application. Data is received from an independent software vendor (ISV) of the application, wherein the data includes a third key. The second key and the third key are combined inside the TEE to create a fourth key. An available memory space in an independent memory device is encrypted using the fourth key to create a secure data volume. Encrypted data is stored in the secure data volume.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that receive encryption keys generated from outside a trusted execution environment. The encryption keys are combined inside the trusted execution environment to generate a new encryption key. The new encryption key is used to encrypt/decrypt a memory device for an application executing in the trusted execution environment.

Computer systems encrypt data by using a secure service container to create an isolated processing environment. If an application wants a secure data volume, it asks a computer system to create the secure data volume. The secure service container receives the data and encrypts the data in memory based on its own protocols. In other words, all the information used for the encryption process originates from within the secure service container. If the memory becomes disconnected from the secure service container, only the secure service container has the information to re-access the encrypted data. Therefore, if the secure service container becomes unavailable, so does the encrypted data.

One or more embodiments of the present invention address one or more of the above-described shortcomings by providing computer-implemented methods, computing systems, and computer program products that include a trusted execution environment (TEE) with a single virtual server running within the TEE. The TEE utilizes a trusted bootloader to encrypt data using encryption keys that are generated external to the TEE, but are manipulated within the TEE. In this sense, if the encrypted data becomes disconnected from the TEE, the keys can be reproduced externally and manipulated in another TEE. Then another virtual server executing in another TEE can decrypt the encrypted data.

Figure 1:
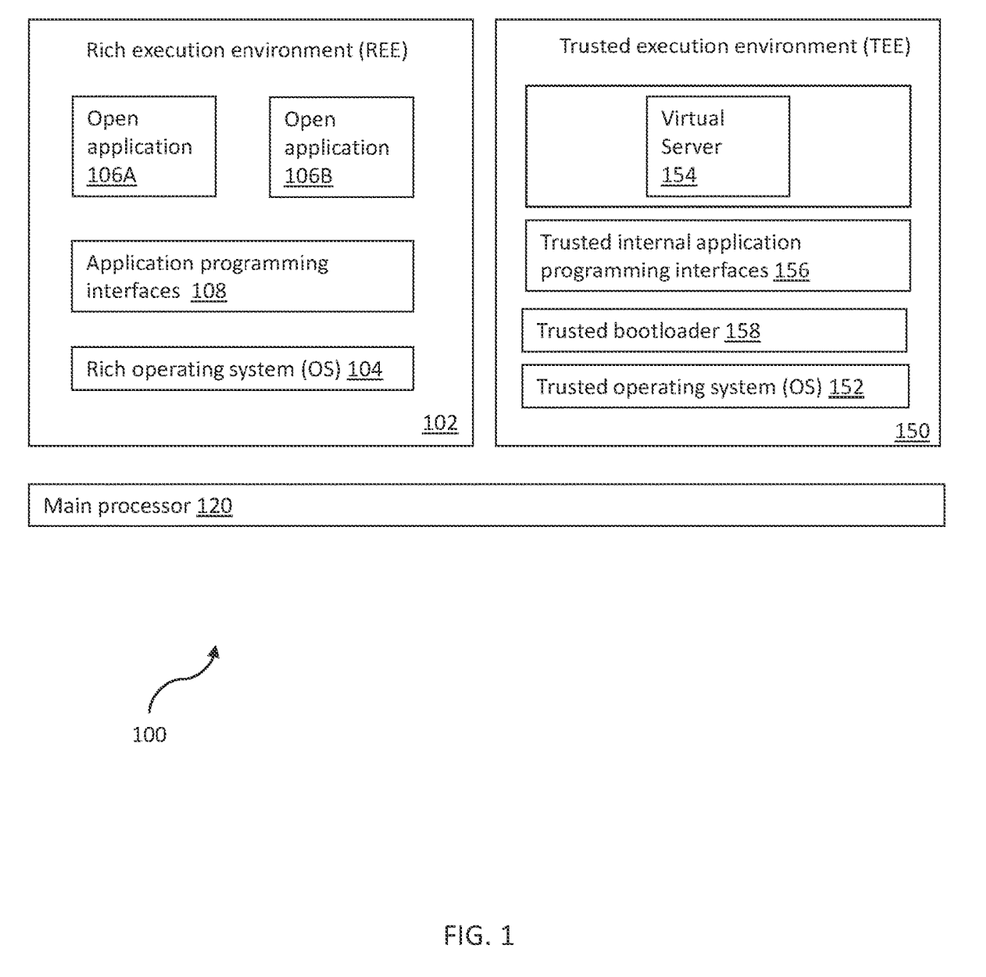
FIG. 1 illustrates a system for encrypting storage for a trusted execution environment in accordance with one or more embodiments of the present invention.

Referring to FIG. 1, a computing environment 100 of a computing device is shown in accordance with one or more embodiments of the present invention. The rich execution environment (REE) 102 is an area on a main processor 120 of a computing device and the environment responsible for holding the main operating system (OS) (e.g., the rich OS 104) of the computing device. The REE 102 includes a memory with computer readable instructions for enabling the features and functionality of the computing device. The rich OS 104 is the main operating system of the computing device and is responsible for providing end customers with the functionality of the computing device. The rich OS 104 is further responsible for the execution of one or more open applications 106A, 106B via a set of application programming interfaces (APIs) 108. Given the number of applications executing in the REE 102, it can be susceptible to attack by malicious actors.

The TEE 150 is an area on the main processor 120 of a computing device that has been separated from the REE 102. The TEE 150 includes a trusted OS 152 that runs parallel to the rich OS 104. The TEE 150 enables data to be stored, processed, and maintained so as to not allow data from outside the TEE 150 to interfere with the data inside the TEE 150. The trusted OS 152 executes a single virtual server 154, via a set of trusted APIs 156. The TEE 150 further includes a trusted bootloader 158 that receives a set of encryption keys for encrypting a data volume of an independent memory device. This process is described in greater detail with reference to FIG. 2. It should be appreciated that some or all of the functionality described herein can be performed on a computer system, for example, the computer system 400 shown in FIG. 4.

The TEE 150 is separated by hardware (e.g., memory regions, busses, peripherals, and interrupts) that are designed to prevent the open applications 106A, 106B executing on the REE 102 from accessing all of the resources of the computing device. On the other hand, the hardware is also designed to permit the virtual server 154 to access all of the resources of the computing device. In addition to hardware, the TEE 150 imposes a security requirement, via software, for all incoming and outgoing data. The computing device can switch between the REE 102 and the TEE 150 via a dedicated instruction to switch from the REE 102 to the TEE 150. For example, an end customer can access an open application 106A on their cell phone (computing device). The application may request that the end customer authenticate their identity via a password. The request to authenticate the end customer's identity can cause a dispatcher to dispatch a dedicated instruction from the main processor 120 to switch to a virtual server 154 executing on the TEE 150. The application can execute on the virtual server 154, preventing any other open application 106B from interfering with the application. Once the authentication process is complete, the trusted OS 152 instructs the dispatcher to issue another instruction to cause the main processor 120 to switch back to the open application 106A in the REE 102.

Figure 2:
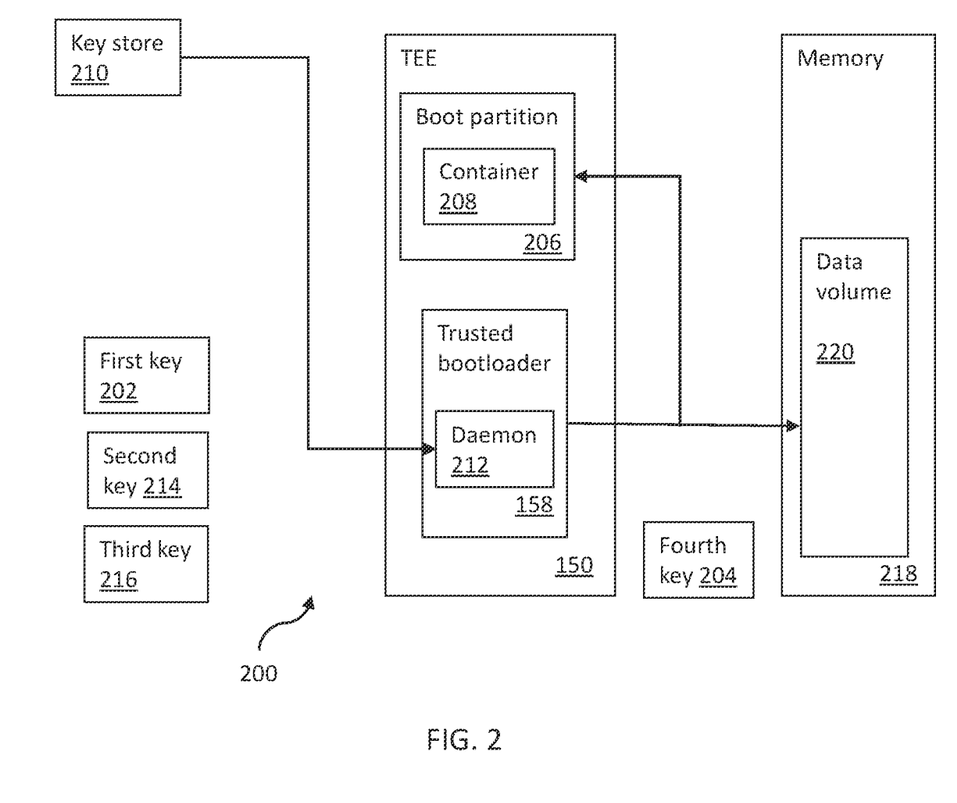
FIG. 2 illustrates a system for encrypting storage for a trusted execution environment in accordance with one or more embodiments of the present invention.

Referring to FIG. 2, a system 200 including the TEE 150 for encrypting storage is shown in accordance with one or more embodiments of the present invention. The TEE 150 includes hardware and software that effectuates a secure environment for a processor, in which code can be stored and executed in isolation from the rest of the processor. The applications and data stored in the TEE 150 are trusted because they are in a preferred state when initially stored or have passed through a signature check prior to entering the TEE 150. The TEE 150 is operable to access its own data but cannot directly access data from another TEE without a signature check. An application operating in the TEE 150 can only access its own data and cannot access the data of another application operating in the TEE 150.

An end customer accesses an application running on a computing device and causes the device to operate in the TEE 150. In some embodiments of the present invention, the end customer enters an input into an application which causes the application to switch from executing in an REE 102 to the TEE 150. A trusted bootloader 158 retrieves a virtual server image from an infrastructure provider (e.g., mobile device operating system) and loads the image in a boot partition 206. The trusted bootloader 158 is a trusted OS software that retrieves an image of a virtual machine for executing in the TEE 150. The image is a template that includes a software configuration for creating an instance of the virtual server in the TEE 150. The boot partition 206 is a logically partitioned area of the TEE 150 used to execute the virtual server. In some embodiments of the present invention, the image of the virtual server is containerized to include libraries and dependencies required to run the code to create a single lightweight executable file, also known as a container 208.

The image that the virtual server 154 is provided by the infrastructure provider (e.g., mobile device operating system) includes a first key 202 embedded as code in the image. The first key 202 is an encryption key that is a variable value that is applied using an algorithm to a string or block of unencrypted text to produce encrypted text or to decrypt encrypted text.

It should be noted that the TEE 150 as a whole is encrypted in the computing device. The trusted bootloader 158, upon receiving the image, further loads the image, and the computer device's firmware encrypts the area that the image is loaded onto, thereby creating the TEE 150. Therefore, any additional keys (e.g., the first key 202, the second key 214, and the third key 216) and data loaded onto the TEE 150 are further encrypted by the outer TEE layer that was created by encrypting the area using the TEE key.

The end customer provides the second key 214 via an interaction with the application to be executed on the virtual server. The second key 214 is an encryption key that is a variable value that is applied using an algorithm to a string or block of unencrypted text to produce encrypted text or to decrypt encrypted text. The second key 214 can include a key derived from a password of the end customer. For example, the application accepting the password can apply a key derivation function (KDF), a cryptographic hash function that derives the second key from the end customer s password. In some embodiments of the present invention, the end customer is not in possession of the second key, and rather the second key is stored in a key store 210 or even by a cryptocurrency service. In these embodiments, the end customer provides a token, which is delivered to a daemon 212 in the trusted bootloader 158. The daemon 212 communicates the token to the key store 210, which then transmits the second key to the daemon 212. The daemon provides the second key 214 to the trusted bootloader 158.

The independent software vendor (ISV) that created the application used by the end customer provides the third key 216 to the TEE 150. In general, the ISV provides data, including information and instructions for an application, that is not visible to the infrastructure provider (e.g., rich OS 104). This information includes where to obtain a workload from and the storage capacity required to perform the workload. This information is included with the application. However, unlike the application, this information is not visible to the infrastructure provider or the end customer. The third key 216 is embedded in this information and is a secret to the infrastructure provider. The third key 216 is an encryption key that is a variable value that is applied using an algorithm to a string or block of unencrypted text to produce encrypted text or to decrypt encrypted text.

The trusted bootloader 158 receives data from the ISV that has been encrypted using the first key 202 and loads the encrypted data onto the virtual server in the boot partition 206. Once the encrypted data is loaded onto the virtual server, the trusted bootloader 158 unencrypts the encrypted data from the ISV using the first key 202, such that the data, including the third key 216 is visible to the virtual server in the boot partition 206. The data from the ISV also includes a request for a memory 218 for the application (e.g., a data block of memory). In addition, the data from the ISV includes instructions for encrypting the data to be stored in memory 218. The trusted bootloader 158 will receive the instructions and request storage in memory. The computing device will provide the memory. However, at this point, the memory is not secure.

The trusted bootloader 158 recognizes the memory is not secure and defines it to encrypt the storage capacity and form a data volume 220. Once encrypted, no entity without a key can interfere with the data volume 220. To encrypt the data volume, the trusted bootloader 158 retrieves the second key 214 and the third key 216 from the virtual server. The trusted bootloader 158 can apply various techniques (e.g., concatenation), using the second key 214 and the third key 216 to generate a fourth key 204. This operation is performed inside the TEE 150 and therefore is not visible to any entity outside of the TEE 150. To ensure that a subsequent trusted bootloader creates the same fourth key 204, the subsequent trusted bootloader would be configured to use the same encryption method to create a new fourth key from the second key 214 and third key 216 as the trusted bootloader 158. Furthermore, no trusted bootloader (including trusted bootloader 158 and the subsequent bootloader) use randomization to assemble the fourth key 204.

If an entity does not have all three keys 202, 214, and 216, the entity cannot recreate the key. However, the same end customer, using the same image to create a virtual server in another TEE, and executing the same workload; can recreate the key to unencrypt the data to access it, even if the memory device has become disconnected from the original virtual server. The end customer also has the ability to revoke anyone from accessing the data. For example, the end customer uses an API key to access a cryptocurrency service (application). The cryptocurrency application can cause cryptocurrency transaction data to be encrypted. At any point, the end customer can revoke the API key, and prevent anyone, including the end customer, from decrypting the cryptocurrency transaction data.

Figure 3:
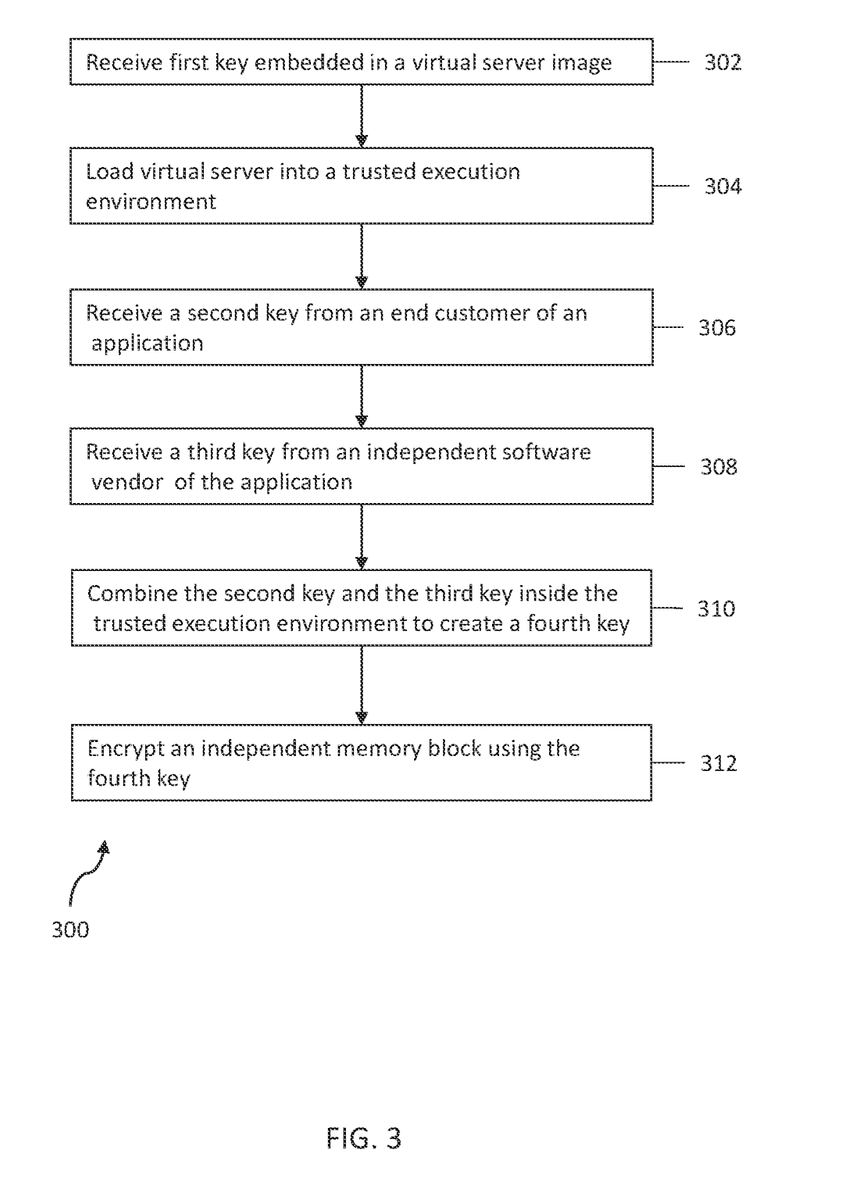
FIG. 3 illustrates a flow diagram for encrypting storage for a trusted execution environment in accordance with one or more embodiments of the present invention.

Referring to FIG. 3, a method 300 for encrypting storage for a trusted execution environment. At block 302, a trusted bootloader 158 in a trusted execution environment (TEE) 150 receives a first key 202 embedded in an image of a virtual server for executing in the TEE 150. For example, an end customer can use an application on their computing device and request a secure function that is executed in the TEE 150. The computing device can turn the request over to the trusted bootloader 158, which requests an image of a virtual server from an infrastructure provider.

At block 304, the trusted bootloader 158 uses the embedded first key 202 to encrypt the virtual server loaded onto a boot partition 206 in the TEE 150. It should be noted that the TEE 150 as a whole has already been encrypted using a TEE key. By using the first key 202 to encrypt data, a second layer of encryption is added to the boot partition 206. This encryption further prevents an end customer and an independent software vendor (ISV) from interfering with the contents of the boot partition 206.

At block 306, the trusted bootloader 158 receives a second key 214 from an end customer of an application to be run on the virtual server. In some embodiments of the present invention, the second key 214 is an application programming interface key or a token to retrieve a key from a key store 210. The trusted bootloader 158 transmits the second key 214 to the virtual server in the boot partition 206.

At block 308, the trusted bootloader 158 receives a third key 216 from the ISV. The trusted bootloader 158 receives data from the ISV that has been encrypted using the first key 202 and transmits the encrypted data to the virtual server in the boot partition 206. The encrypted data includes information, such as the amount of memory required to perform the requested function, where to obtain a workload from, and how to execute the workload. In addition to this information, the third key 216 is embedded in this encrypted data.

At block 310, the virtual server combines the second key 214 and the third key 216 to generate a fourth key 204. The virtual server performs this function within the TEE 150 and outside the purview of the infrastructure provider, the end customer, and the ISV. The virtual server is operable to combine the second key 214 and the third key 216 to create the fourth key 204 using various techniques.

At block 312, the trusted bootloader 158 encrypts an available memory to create a data volume 220 (i.e., secure memory). The data provided by the ISV includes a requested storage capacity. The trusted bootloader 158 receives the request and contacts the memory device of the computing device to create available memory space. The memory creates an unencrypted data block(s) for the trusted bootloader 158. The trusted bootloader 158 receives the fourth key 204 from the virtual server and encrypts the available memory space to create a data volume 220. The virtual server can then load and retrieve encrypted data onto and from the data volume 220.

Figure 4:
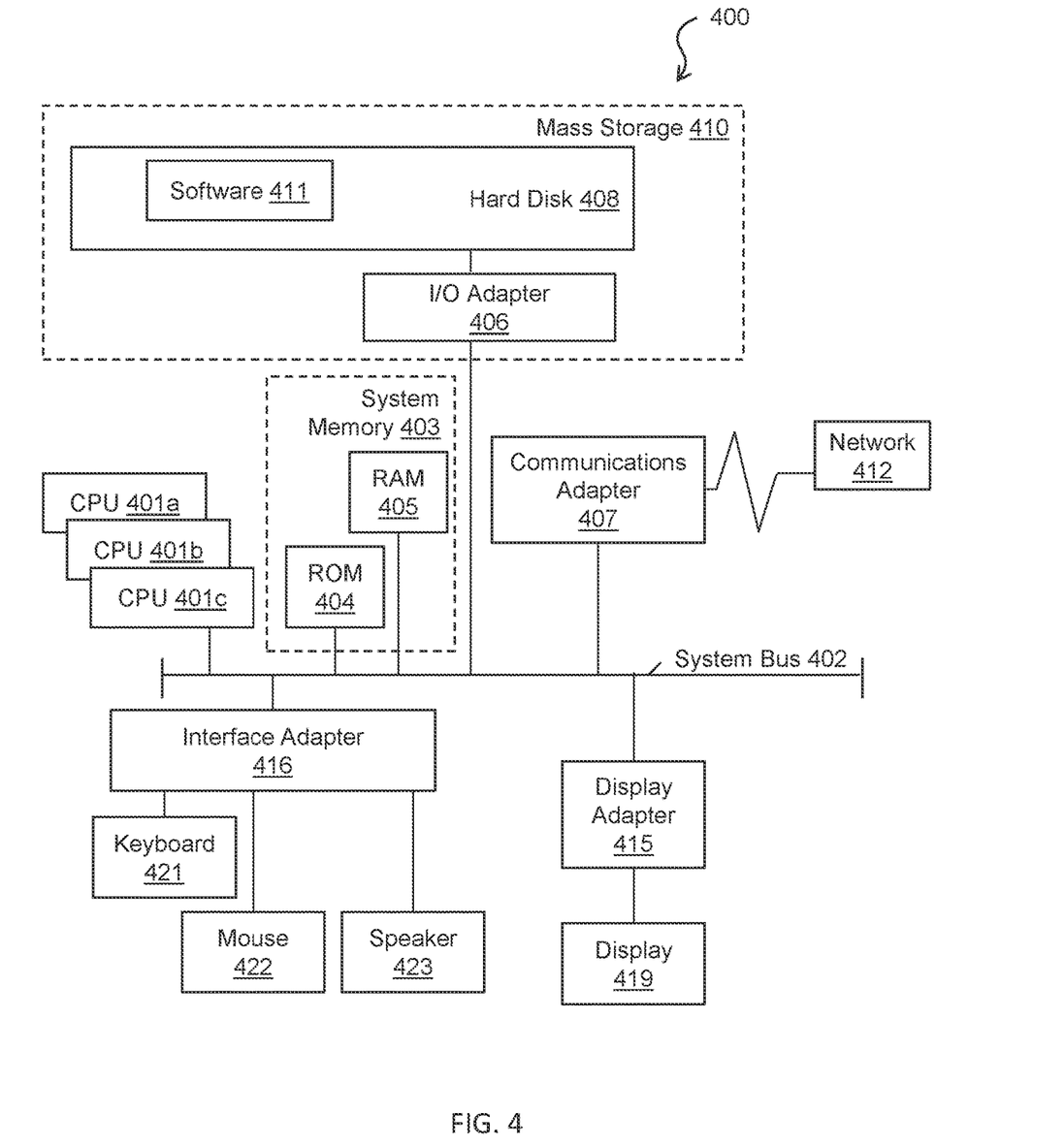
FIG. 4 illustrates a block diagram of a computer system for use in implementing one or more embodiments of the present invention.

In one or more embodiments of the present invention, the hardware/software modules in the system 100 from FIG. 1 can be implemented on the computer system 400 found in FIG. 4. Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401*a*, 401*b*, 401*c*, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 502 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the end customer's computer, partly on the end customer's computer, as a stand-alone software package, partly on the end customer's computer and partly on a remote computer or entirely on the remote computer or server. In the latter scenario, the remote computer may be connected to the end customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    loading, by a processor, an image of a virtual server onto a boot partition of a trusted execution environment (TEE), wherein a first key is embedded in the image;
    receiving, by the processor, a second key from an end customer of an application;
    receiving, by the processor, data from an independent software vendor (ISV) of the application, wherein the data includes a third key;
    combining, by the processor and in the TEE, the second key and the third key to create a fourth key;
    encrypting, by the processor, an available memory space in an independent memory device using the fourth key to create a secure data volume; and
    storing encrypted data in the secure data volume.

2. The computer-implemented method of claim 1, wherein the method further comprises:
    retrieving a request for the available memory space from the data from the ISV;
    requesting the available memory space from the independent memory device;
    receiving the available memory space from the independent memory device; and
    encrypting the available memory space using the fourth key to create the secure data volume.

3. The computer-implemented method of claim 1, wherein the method further comprises retrieving the encrypted data from the secure data volume.

4. The computer-implemented method of claim 1, wherein the second key is stored in a key store, the method further comprises:
    receiving a token for accessing the key store storing the second key;
    executing a daemon of the trusted bootloader to communicate the token to the key store; and
    receiving the second key from the key store.

5. The computer-implemented method of claim 1, wherein the image is a containerized image.

6. The computer-implemented method of claim 1, wherein the data from the ISV of the application has been encrypted using the first key.

7. The computer-implemented method of claim 1, wherein the second key is an application programming interface (API) key.

8. A system comprising:
    a memory having computer readable instructions; and
    one or more processors for executing the computer readable instructions, the computer readable instructions controlling the one or more processors to perform operations comprising:
    loading an image of a virtual server onto a boot partition of a trusted execution environment (TEE), wherein a first key is embedded in the image;
    receiving a second key from an end customer of an application;
    receiving data from an independent software vendor (ISV) of the application, wherein the data includes a third key;
    combining, in the TEE, the second key and the third key to create a fourth key;
    encrypting an available memory space in an independent memory device using the fourth key to create a secure data volume; and
    storing encrypted data in the secure data volume.

9. The system of claim 8, wherein the operations further comprise:
    retrieving a request for the available memory space from the data from the ISV;
    requesting the available memory space from the independent memory device;
    receiving the available memory space from the independent memory device; and
    encrypting the available memory space using the fourth key to create the secure data volume.

10. The system of claim 8, wherein the operations further comprise retrieving the encrypted data from the secure data volume.

11. The system of claim 8, wherein the second key is stored in a key store, the operations further comprise:
  receiving a token for accessing the key store storing the second key;
  executing a daemon of the trusted bootloader to communicate the token to the key store; and
  receiving the second key from the key store.

12. The system of claim 8, wherein the image is a containerized image.

13. The system of claim 8, wherein the data from the ISV of the application has been encrypted using the first key.

14. The system of claim 8, wherein the second key is an application programming interface (API) key.

15. A computer program product comprising a computer readable storage medium having program instructions embodied therewith, the program instructions executable by a processor to cause the processor to perform operations comprising:
  loading an image of a virtual server onto a boot partition of a trusted execution environment (TEE), wherein a first key is embedded in the image;
  receiving a second key from an end customer of an application;
  receiving data from an independent software vendor (ISV) of the application, wherein the data includes a third key;
  combining, in the TEE, the second key and the third key to create a fourth key;
  encrypting an available memory space in an independent memory device using the fourth key to create a secure data volume; and
  storing encrypted data in the secure data volume.

16. The computer program product of claim 15, wherein the operations further comprise:
  retrieving a request for the available memory space from the data from the ISV;
  requesting the available memory space from the independent memory device;
  receiving the available memory space from the independent memory device; and
  encrypting the available memory space using the fourth key to create the secure data volume.

17. The computer program product of claim 15, wherein the operations further comprise retrieving the encrypted data from the secure data volume.

18. The computer program product of claim 15, wherein the second key is stored in a key store, the operations further comprise:
  receiving a token for accessing the key store storing the second key;
  executing a daemon of the trusted bootloader to communicate the token to the key store; and
  receiving the second key from the key store.

19. The computer program product of claim 15, wherein the image is a containerized image.

20. The computer program product of claim 15, wherein the data from the ISV of the application has been encrypted using the first key.

* * * * *